(12) United States Patent
Mennekens (10) Patent No.: US 11,646,758 B2
(45) Date of Patent: May 9, 2023

(54) UWB MESSAGE TRANSMISSION METHOD AND DEVICE, METHOD AND DEVICE FOR ESTIMATING POSITION ON THE BASIS OF UWB MESSAGES

(71) Applicant: UWINLOC, Blagnac (FR)

(72) Inventor: Jan Mennekens, Fabas (FR)

(73) Assignee: UWINLOC, Blagnac (FR)

( * ) Notice: Subject to any disclaimer, the term of this patent is extended or adjusted under 35 U.S.C. 154(b) by 347 days.

(21) Appl. No.: 16/623,612

(22) PCT Filed: Jun. 27, 2018

(86) PCT No.: PCT/EP2018/067192
§ 371 (c)(1),
(2) Date: Dec. 17, 2019

(87) PCT Pub. No.: WO2019/002341
PCT Pub. Date: Jan. 3, 2019

(65) Prior Publication Data
US 2020/0209336 A1 Jul. 2, 2020

(30) Foreign Application Priority Data

Jun. 27, 2017 (FR) ...................................... 1755867

(51) Int. Cl.
*H04B 1/38* (2015.01)
*G01S 1/04* (2006.01)
(Continued)

(52) U.S. Cl.
CPC .............. *H04B 1/38* (2013.01); *G01S 1/0428* (2019.08); *H04B 1/71635* (2013.01); *H04W 74/085* (2013.01)

(58) Field of Classification Search
CPC .... G01S 1/0428; H02J 50/00; H04B 1/71635; H04W 74/085
See application file for complete search history.

(56) References Cited

U.S. PATENT DOCUMENTS 5,266,925 A 11/1993 Vercellotti et al.
5,986,570 A 11/1999 Black et al.
(Continued)

FOREIGN PATENT DOCUMENTS

CN 102510300 6/2012
CN 104700143 6/2015
(Continued)

OTHER PUBLICATIONS

International Search Report of international patent application PCT/EP2018/067192 dated Nov. 16, 2018.

*Primary Examiner* — John W Poos
*Assistant Examiner* — Tyler J Pereny
(74) *Attorney, Agent, or Firm* — Perman & Green, LLP (57) ABSTRACT

An emitting method, by an emitting device to at least one receiving station, of UWB messages, the emitting device including a simplex communication module for the emitting of UWB messages, a module for receiving wireless electrical energy suitable for receiving emitted electrical energy and for storing the electrical energy received in an electric accumulator, the method including a charging of the electric accumulator by the module for receiving wireless electrical energy, an evaluation of a criterion of sufficient electrical energy for the emitting of a UWB message, when the criterion of sufficient electrical energy for the emitting of a UWB message is satisfied, a selecting of a random emission delay and an emitting of the UWB message, by the simplex communication module, after the expiration of the random emission delay selected.

9 Claims, 2 Drawing Sheets

(51) Int. Cl.
*H04B 1/7163* (2011.01)
*H04W 74/08* (2009.01)

(56) References Cited

U.S. PATENT DOCUMENTS

| | | | | |
|---|---|---|---|---|
| 2007/0109099 A1* | 5/2007 | Raphaeli | ............ | G06K 7/10306 |
| | | | | 340/10.2 |
| 2010/0014315 A1 | 1/2010 | Fujimoto | | |
| 2011/0260757 A1* | 10/2011 | Cathelin | .............. | H04B 1/7174 |
| | | | | 327/105 |
| 2012/0134389 A1* | 5/2012 | Pahlavan | ........... | H04B 1/71635 |
| | | | | 375/E1.001 |

FOREIGN PATENT DOCUMENTS

| | | |
|---|---|---|
| CN | 106650879 | 5/2017 |
| CN | 106980890 | 7/2017 |
| TW | 200638207 | 11/2006 |

* cited by examiner

UWB MESSAGE TRANSMISSION METHOD AND DEVICE, METHOD AND DEVICE FOR ESTIMATING POSITION ON THE BASIS OF UWB MESSAGES

CROSS REFERENCE TO RELATED APPLICATIONS

This application is a National Stage of International Application No. PCT/EP2018/067192, having an International Filing Date of 27 Jun. 2018, which designated the United States of America, and which International Application was published under PCT Article 21(2) as WO Publication No. 2019/002341 A1, which claims priority from and the benefit of French Patent Application No. 1755867, filed on 27 Jun. 2017, the disclosures of which are incorporated herein by reference in their entireties.

BACKGROUND

1. Field

This disclosure belongs to the field of systems for estimating the position of objects, and relates more particularly to an emitting method, by an emitting device of which the position must be estimated, messages in the form of sequences of ultra-wide band radio pulses, referred to as "UWB messages".

2. Brief Description of Related Developments

Today, it is known to provide objects of which the position must be estimated with emitting devices suitable for emitting UWB messages (see for example US patent application 2007/109099 A1).

The term "Ultra Wide Band" (UWB) means that the UWB message, emitted in the form of a radio signal, has at a given instant an instantaneous frequency spectrum with a width (at −10 dB in relation to the maximum power of said instantaneous frequency spectrum) greater than 500 megahertz (MHz).

In the known systems for estimating the position, a UWB message emitted by an emitting device is received by a plurality of receiving stations with respective predetermined positions. The position of the emitting device can then be estimated, conventionally, according to the UWB messages received by the receiving stations and the positions of said receiving stations. For example, when the same UWB message is received by several receiving stations, the position of the emitting device can be estimated by comparing the respective times of arrival of said UWB message on each one of said receiving stations. In particular, the position of said emitting device can be estimated, in a manner known per se, by calculating for several pairs of receiving stations differences between the times of arrival of said UWB message on the receiving stations of each pair ("Time Difference of Arrival" or TDOA).

It is also possible in certain cases to estimate the position of an emitting device by means of a single receiving station. For example, in the case of a mobile emitting device, the receiving station can be provided on a gantry through which the emitting device is supposed to pass. In this case, the system for estimating the position can be configured to force the emitting device to emit a UWB message during the passage through the gantry in such a way that, when the receiving station receives the UWB message, the estimated position of said emitting device corresponds to that of the gantry.

Such systems for estimating the position may have to locate a very large number of emitting devices, for example in the case where this entails locating objects in a storage hangar. Likewise, it is possible that many objects pass simultaneously through a gantry such as described hereinabove, for example in the case where the gantry is positioned at the entrance of a storage hangar.

The more the number of objects provided with emitting devices increases, the more the probability of collisions between UWB messages emitted by different emitting devices increases. However such collisions can hinder the estimating of the position of certain emitting devices.

SUMMARY

This disclosure has an objective to overcome all or a part of the limitations of the solutions of prior art, in particular those mentioned hereinabove, by proposing a solution that makes it possible to reduce the collisions between UWB messages emitted by different emitting devices.

Furthermore, this disclosure also has an objective to propose a solution that makes it possible, at least in certain aspects of the disclosure, to reduce the electrical consumption of the emitting devices Furthermore, this disclosure also has for objective to propose a solution that makes it possible, at least in certain aspects of the disclosure, to reduce the electrical consumption of the emitting devices.

To this effect, and according to a first aspect, the disclosure relates to a method for emitting, by an emitting device to at least one receiving station, messages in the form of sequences of ultra-wide band radio pulses, referred to as "UWB messages", said emitting device comprising a simplex communication module for the emitting of UWB messages. Said emitting device further comprising a module for receiving wireless electrical energy suitable for receiving electrical energy emitted by at least one wireless electrical power supply station and for storing the electrical energy received in an electric accumulator of said emitting device, said method comprises:

a charging of the electric accumulator by the module for receiving wireless electrical energy, an evaluation of a criterion of sufficient electrical energy for the emitting of a UWB message, when the criterion of sufficient electrical energy for the emitting of a UWB message is satisfied: a selecting of a random emission delay and an emitting of the UWB message, by the simplex communication module, after the expiration of said random emission delay selected.

As such, the emitting device comprises a module for receiving wireless electrical energy which is electrically powered remotely by a wireless electrical power supply station, the electrical energy received being stored in an electric accumulator of the emitting device. When a criterion of sufficient electrical energy for the emitting of a UWB message is satisfied, the emitting device triggers the emitting of a UWB message.

Such arrangements make it possible to emit UWB messages at instants that tend to be random and de-correlated from one emitting device to another. Indeed, the charging conditions, for example the distance from the closest wireless electrical power supply station, will generally vary from one emitting device to another, in such a way that the time required to store in the electric accumulator an electrical energy sufficient for the emitting of a UWB message will generally vary from one emitting device to another. As such, even if two emitting devices simultaneously emit UWB messages, then the subsequent emitting of new UWB messages by these emitting devices will be done at different instants if the charging conditions of these emitting devices are different.

Furthermore, in order to improve the random nature of the emitting instants of UWB messages, the emitting device, before emitting the UWB message considered, selects a random emission delay and emits said UWB message only after the expiration of said random emission delay selected. Such arrangements are advantageous for randomly spreading over time the emitting of UWB messages by emitting devices encouraged moreover to emit simultaneously, for example when these emitting devices together pass through a gantry such as described hereinabove. For example, the gantry can be provided with one or several wireless electrical power supply stations, in order to very quickly charge the emitting devices passing together in the vicinity of said gantry, which would tend to group together the emitting of UWB messages by using only the sufficient electrical energy criterion. The random emission delay is selected to randomly spread over time the emissions of UWB messages. In the example of the gantry, the random emission delay is for example selected less than a predetermined threshold value in order to ensure that the emitting of a UWB message is carried out in the vicinity of said gantry.

Note that the selecting and the using of a random emission delay can concern only the emitting of certain UWB messages emitted by the emitting device. As such, it is possible to emit certain UWB messages without selecting and without using a random emission delay.

In particular aspects of the disclosure, the emitting method can further comprise one or several of the following characteristics, taken individually or according to all the technically permissible combinations.

In particular aspects of the disclosure, when the electrical energy is sufficient to successively emit a first UWB message and a second UWB message, a random emission delay is selected and used to delay the emitting of only one UWB message among the first UWB message and the second UWB message.

As such, when the electrical energy is sufficient to successively emit two UWB messages, the emitting device selects and uses a random emission delay only for the emitting of one of these UWB messages, the other UWB message is emitted as soon as possible, without applying a random emission delay.

Such arrangements are particularly advantageous in that they make it possible to reduce the probability of collision between UWB messages emitted by different emitting devices while still reducing the electrical consumption of the emitting device. Indeed, waiting until the expiration of the random emission delay results in a non-negligible electrical consumption, in particular in the case of a wireless electrical power supply. This electrical consumption is reduced by limiting the wait before emitting to only one of the two UWB messages.

In particular aspects of the disclosure, a random emission delay is selected and used to delay the emitting of only the second UWB message.

Such arrangements make it possible to further reduce the probability of collision. Indeed, if the first UWB messages of two emitting devices are emitted simultaneously and collide, then the second UWB messages will in principle be emitted at different instants, due to the fact that the respective random delays selected will statistically be different.

Note that in the alternative aspect of the disclosure wherein a random emission delay is selected and used to delay the emitting of only the first UWB message, then the probability of collision between the first UWB messages is reduced. However, in the case where the first UWB messages of two emitting devices are even so emitted simultaneously and collide, then the second messages could also be emitted simultaneously and collide.

In particular aspects of the disclosure, the emitting of a UWB message comprises:
an obtaining of a sequence of information bits,
a modulation of the sequence of information bits in such a way as to obtain a sequence of information symbols, the possible information symbols corresponding to different spreading codes associated respectively with groups of information bits with different values,
a forming of the UWB message from the sequence of information symbols.

In particular aspects of the disclosure, each ultra-wide band radio pulse is formed by multiplying a sinusoidal signal by a pulse envelope.

According to a second aspect, the disclosure relates to a method for estimating the position of an emitting device, comprising:
an emitting, by the emitting device, of UWB messages in accordance with an emitting method according to any of the aspects of the disclosure,
a receiving of UWB messages emitted by the emitting device by at least one receiving station having a predetermined position,
an estimating of the position of the emitting device according to the UWB messages received by said at least one receiving station.

According to a third aspect, the disclosure relates to a computer program product comprising a set of program code instructions which, when they are executed by an emitting device, configure said emitting device to implement an emitting method according to any of the aspects of the disclosure.

According to a fourth aspect, the disclosure relates to an emitting device suitable for emitting to at least one receiving station messages in the form of sequences of ultra-wide band radio pulses, referred to as "UWB messages", said emitting device comprising a simplex communication module for the emitting of UWB messages. Furthermore, said emitting device comprises a module for receiving wireless electrical energy suitable for receiving electrical energy emitted by at least one wireless electrical power supply station and for storing the electrical energy received in an electric accumulator of said emitting device, and a control module configured to:
evaluate a criterion of sufficient electrical energy, in the electric accumulator charged by the module for receiving wireless electrical energy, for the emitting of a UWB message,
when the criterion of sufficient electrical energy for the emitting of a UWB message is satisfied: select a random emission delay and emit a UWB message, via the simplex communication module, after the expiration of said random emission delay selected.

In particular aspects of the disclosure, the emitting device can further comprise one or several of the following characteristics, taken individually or according to all the technically permissible combinations.

In particular aspects of the disclosure, the control module is configured to, when the electrical energy is sufficient to successively emit a first UWB message and a second UWB message, select and use a random emission delay to delay the emitting of only one UWB message among the first UWB message and the second UWB message.

In particular aspects of the disclosure, the control module is configured to select and use a random emission delay to delay the emitting of only the second UWB message.

In particular aspects of the disclosure, for the emitting of a UWB message, the control module is configured to:
  obtain a sequence of information bits,
  modulate the sequence of information bits in such a way as to obtain a sequence of information symbols, the possible information symbols corresponding to different spreading codes associated respectively with groups of information bits with different values,
  form the UWB message from the sequence of information symbols.

In particular aspects of the disclosure, each ultra-wide band radio pulse is formed by multiplying a sinusoidal signal by a pulse envelope.

According to a fifth aspect, the disclosure relates to a system for estimating the position, comprising:
  an emitting device according to any of the aspects of the disclosure,
  at least one wireless electrical power supply station,
  at least one receiving station, having a predetermined position, suitable for receiving UWB messages emitted by the emitting device,
  at least one server configured to estimate the position of the emitting device according to the UWB messages received by said at least one receiving station.

BRIEF DESCRIPTION OF THE DRAWINGS

The disclosure shall be better understood when reading the following description, given as an example that is in no way limiting, and given in reference to the figures which show.

In these figures, identical references from one figure to another designate identical or similar elements. For reasons of clarity, the elements shown are not to scale, unless mentioned otherwise.

DETAILED DESCRIPTION

This disclosure relates, in particular, such as indicated hereinabove, to a method 60 for emitting, by an emitting device 20 to a receiving station 30, messages in the form of sequences of ultra-wide band radio pulses, referred to as "UWB messages". Such UWB messages, formed by a sequence of radio pulses, are also designated as "Ultra Wide Band-Impulse Radio" (UWB-IR).

In the rest of the description, we consider in a non-limiting manner the case where the method 60 for emitting is used by emitting devices 20 in a system 10 for estimating the respective positions of said emitting devices 20. Note however that the disclosure can be applied more generally to any type of wireless communication system wherein emitting devices 20 emit UWB messages, and especially in the systems wherein the probability of collision between UWB messages emitted by different emitting devices 20 is not negligible. In the context of a system 10 for estimating the position, the UWB messages emitted by the same emitting device 20 can all be identical, and the information bits included in a UWB message can comprise or consist in a unique identifier of said emitting device 20.

Figure 1:
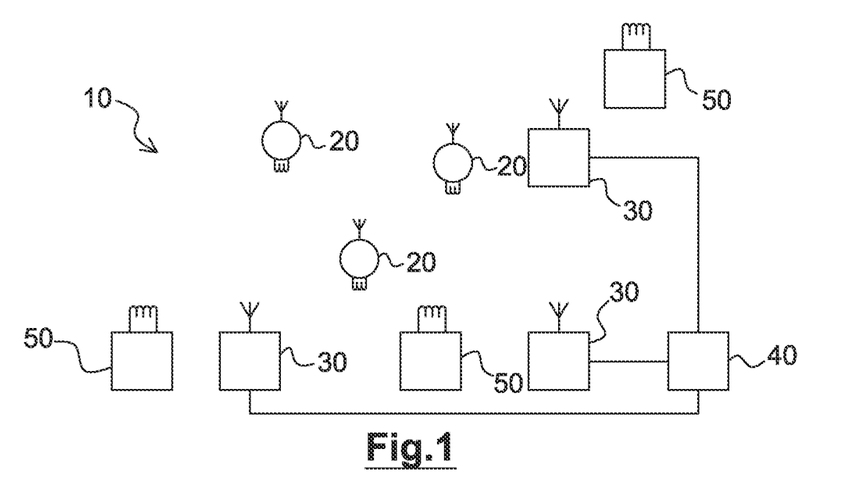
FIG. 1: a schematic representation of an aspect of a system for estimating the position of emitting devices of UWB messages.

FIG. 1 schematically shows an aspect of a system 10 for estimating the position of emitting devices 20. As shown in FIG. 1, the system 10 for estimating the position comprises a plurality of receiving stations 30. Said receiving stations 30 are distributed over a geographical zone wherein said emitting devices 20, which are provided on the objects to be located which can be mobile or immobile, are supposed to be found. For example, the geographical zone corresponds to a storage hangar of said objects.

The receiving stations 30 have for example predetermined respective positions. Such as indicated hereinabove, the position of an emitting device 20 can be estimated, conventionally, according to the UWB messages received by the receiving stations 30 and the positions of said receiving stations 30. For example, when the same UWB message is received by several receiving stations 30, the position of the emitting device can be estimated by comparing the respective times of arrival of the UWB message on each one of the receiving stations 30. In particular, the position of said emitting device 20 can be estimated, in a manner known per se, by calculating for several pairs of receiving stations 30 differences between the times of arrival (TDOA) of the UWB message on the receiving stations 30 of each pair.

For example, each receiving station 30 that receives the UWB message from an emitting device 20 timestamps the latter and transmits it to a server 40 that calculates the differences between the times of arrival and deduces there from, according to the positions of the receiving stations 30, the position of said emitting device 20.

Note that estimating the position of an emitting device 20 is not limited to an estimation based on the differences of times of arrival, but can be applied to any method of estimating position known to those skilled in the art, that can use in particular, alternatively or as a complement, the powers of arrival and/or the frequencies of arrival of the UWB messages on said receiving stations 30. Note however that the UWB messages make it possible to have time of arrival measurements that are very precise, which also makes it possible to estimate the position of the emitting device 20 very precisely.

In the example shown in FIG. 1, the system 10 for estimating the position comprises a single server 40. Nothing excludes however, according to other examples, having several servers 40. Furthermore, in the example shown in FIG. 1, the system 10 for estimating comprises a plurality of receiving stations 30. Such as indicated hereinabove, the locating is also possible with a single receiving station 30, for example installed in a gantry positioned at the entrance of a storage hangar.

As shown in FIG. 1, the system 10 for estimating the position further comprises for example wireless electrical power supply stations 50 distributed over the geographical zone covered by the receiving stations 30. The wireless electrical power supply stations 50 remotely supply the emitting devices 20 with electrical energy. As with the receiving stations 30, the system 10 for estimating the position can, according to other examples, comprise a single wireless electrical power supply station 50, for example installed in a gantry.

In the example shown in FIG. 1, the wireless electrical power supply stations 50 are separate from the receiving stations 30. Nothing excludes however, according to other examples, having one or several of said wireless electrical power supply stations 50 which are integrated into one or several receiving stations 30, in such a way that at least one piece of equipment of said system 10 for estimating the position is both a wireless electrical power supply station 50 and a receiving station 30.

Figure 2:
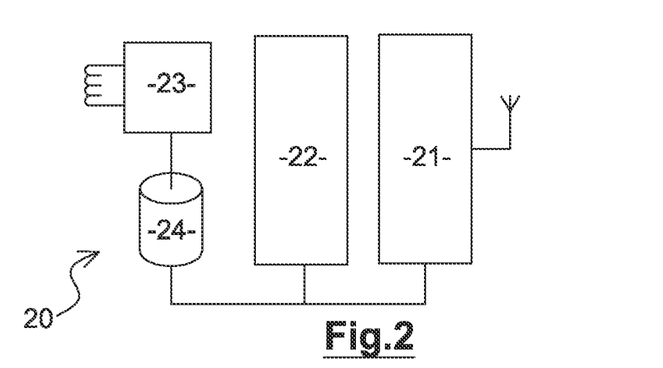
FIG. 2: a schematic representation of an aspect of an emitting device of UWB messages.

FIG. 2 schematically shows an aspect of an emitting device 20.

As shown in FIG. 2, the emitting device 20 comprises for example a simplex communication module 21 for the emitting of UWB messages. The term "simplex" means that the communication module is suited only for emitting UWB messages but does not make it possible to receive UWB messages emitted by other emitting devices 20.

The simplex communication module 21 has for example the form of an electrical circuit comprising equipment (antenna, amplifier, local oscillator, mixer, analogue filter, etc.) known to those skilled in the art.

For example, the simplex communication module 21 is configured to emit the UWB messages in a frequency band centered on 4 gigahertz (GHz) and/or centered on 7.25 GHz. Nothing excludes however considering frequency bands centered on other frequencies.

The UWB messages, emitted in the form of radio signals, have at a given instant an instantaneous frequency spectrum with a predetermined width, for example between 500 megahertz (MHz) and 2.5 GHz, which corresponds to radio pulses with durations respectively between a few nanoseconds and a few tens of nanoseconds.

In preferred aspects of the disclosure, the simplex communication module 21 is configured to emit the UWB messages by using a radio pulse modulation as "On Off Keying" (OOK) of the bits to be emitted, i.e. the values of the bits to be emitted are coded by a presence or an absence of radio pulse. For example, if at a given instant the bit to be emitted is "1" then the simplex communication module 21 emits a radio pulse, while if the bit to be emitted is "0" said simplex communication module 21 does not emit a radio pulse. Such arrangements are advantageous in that they make it possible to reduce the electrical consumption required to emit a UWB message, since the emitting of bits to be emitted at "0" consumes almost no electrical energy.

Nothing excludes however, according to other examples, considering other types of radio pulse modulation. In particular, it is also possible to use a "Pulse Position Modulation" (PPM). For example, considering that the bits to be emitted in the form of radio pulses are sequenced at a predetermined period Tc, then at each period Tc, the pulses are emitted with a shift in relation to the period Tc, the value of said shift depending on the value of the bit to be emitted.

In particular aspects of the disclosure, each ultra-wide band radio pulse can be formed by multiplying a sinusoidal signal by a pulse envelope. In other terms, the local oscillator forming the sinusoidal signal corresponding to the carrier frequency of the radio pulses can remain activated continuously over the duration of the UWB message, and the amplitude of said sinusoidal signal is modulated by said pulse envelope. Outside of the radio pulse emitting instants, the amplitude of the sinusoidal signal is modulated by a signal with a zero value.

The modulated signal obtained after amplitude modulation of the sinusoidal signal is then supplied as input of the amplifier, which can also remain activated throughout the entire duration of the UWB message to be emitted.

Such arrangements make it possible to more precisely form the sequence of ultra-wide band radio pulses, in relation to the emitting devices according to the prior art wherein the radio pulses are formed by supplying the sinusoidal signal directly as input of the amplifier, and by activating the amplifier at the beginning of the emitting of a radio pulse and by deactivating said amplifier at the end of the emitting of said radio pulse. In these emitting devices according to the prior art, the envelopes of the radio pulses are not very precise because they depend on the precision with which the activation/deactivation instants of the amplifier can be controlled, with the form of the pulse envelope being moreover difficult to control.

By modulating the sinusoidal signal by a pulse envelope before amplifying, the radio pulses are formed before the amplifier. Said amplifier therefore no longer forms the radio pulses but does amplify said radio pulses formed beforehand. Note that it is however possible to deactivate the amplifier between the radio pulses in order to reduce the electrical consumption of the amplifier.

Note however that any technique of forming radio pulses known to those skilled in the art can be implemented by the simplex communication module 21.

As shown in FIG. 2, the emitting device 20 also comprises a control module 22. For example, the control module 22 comprises one or several processors and means for memorization (magnetic hard drive, electronic memory, optical disc, etc.) in which a computer program product is memorized, in the form of a set of program code instructions to be executed in order to implement, in collaboration with the other equipment of the emitting device 20, all or a portion of the steps of the method 60 for emitting UWB messages. Alternatively or as a complement, the control module 22 comprises one or more programmable logic circuits (FPGA, PLD, etc.), and/or one or more specific integrated circuits (ASIC), and/or a set of discrete electronic components, etc., suitable for implementing all or a portion of said steps of the method 60 for emitting UWB messages.

In other terms, the control module 22 comprises a set of software configured means (specific computer program product) and/or hardware configured means (FPGA, PLD, ASIC, discrete electronic components, etc.) in order to implement, in collaboration with the other equipment of said emitting device 20, all of the steps of the method 60 of emitting UWB messages that will be described hereinafter.

As shown in FIG. 2, the emitting device 20 further comprises a module 23 for receiving wireless electrical energy suitable for receiving the electrical energy emitted by one or several wireless electrical power supply stations 50. The emitting device 20 also comprises an electric accumulator 24 connected to the module 23 for receiving wireless electrical energy, wherein the electrical energy received is stored.

The module 23 for receiving wireless electrical energy has for example the form of an electrical circuit comprising equipment known to those skilled in the art. For example, the electrical circuit comprises an antenna of the coil type wherein an electric current can be induced when said antenna of the coil type is placed in an electromagnetic field (in near or far field), formed for example by one or several wireless electrical power supply stations 50. The electrical circuit can also comprise, for example, an AC/DC converter connected to the electric accumulator 24.

For example, the module 23 for receiving wireless electrical energy is configured to receive the electrical energy received in a frequency band centered on 867 MHz and/or centered on 915 MHz. For example, the module 23 for receiving wireless electrical energy can be compatible, for the wireless electrical energy receiving portion, with the RFID technology ("Radio Frequency Identification").

The electric accumulator 24 can have any suitable form. In preferred aspects of the disclosure, the electric accumulator 24 is formed by one or several capacitors. Such arrangements are advantageous in that such an electric accumulator 24 can be carried out particularly simply and economically. The electric accumulator 24 is used as a source of electrical energy for the various pieces of equipment of the emitting device 20, in particular for the control module 22 and the simplex communication module 21.

Figure 3:
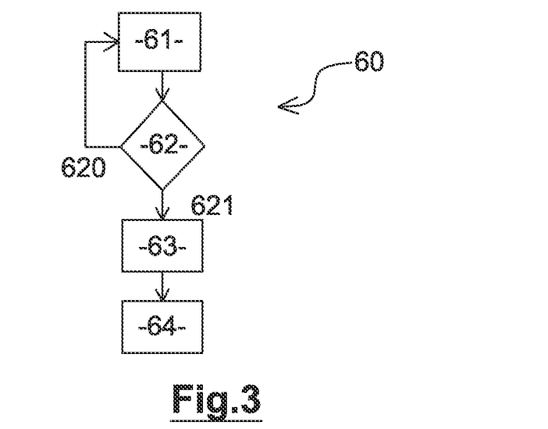
FIG. 3: a functional diagram showing the main steps of a method for emitting UWB messages.

FIG. 3 schematically shows the main steps of a method 60 for emitting UWB messages.

As shown in FIG. 3, the method 60 for emitting comprises a step 61 of charging the electric accumulator 24 by the module 23 for receiving wireless electrical energy.

During the step 61 of charging, the module 23 for receiving wireless electrical energy receives electrical energy provided by one or several wireless electrical power supply stations 50. The electrical energy received is stored in the electric accumulator 24, of which the charging increases progressively over time. In order to accelerate the charging of the electric accumulator 24, it may be necessary or advantageous to deactivate certain pieces of equipment of the emitting device 20, such as for example the simplex communication module 21.

The method 60 for emitting further comprises a step 62 of evaluating a criterion of sufficient electrical energy for the emitting of a UWB message. The step 62 of evaluating is for example executed continuously or recurrently, simultaneously with the step 61 of charging, and aims at detecting the instant at which the electrical energy stored in the electric accumulator 24 becomes sufficient to emit a UWB message.

For example, it is possible to determine a priori a threshold value of the electrical voltage at the terminals of the electric accumulator 24 that corresponds to a stored quantity of electrical energy that is sufficient to emit a UWB message. The step 62 of evaluating a sufficient electrical energy criterion corresponds in this case to measuring the electrical voltage at the terminals of the electric accumulator 24 and to comparing the electrical voltage measured to said threshold value. If the electrical voltage measured is less than said threshold value (reference 620 in FIG. 3), the sufficient energy criterion is not satisfied and the execution of the step 62 of evaluating continues at the same time as the charging of the electric accumulator 24. If the electrical voltage measured is greater than said threshold value (reference 621 in FIG. 3), the sufficient energy criterion is satisfied and it is possible to emit a UWB message.

It is possible, according to other examples, to consider other types of sufficient energy criteria, and the choice of a particular sufficient energy criterion forms only an alternative in the implementation of the disclosure, as long as it makes it possible to determine if the electrical energy stored in the electric accumulator is sufficient to emit a UWB message.

For example, the control module 22 can comprise a set of discrete electronic components configured to detect when the electrical energy stored in the electric accumulator 24 is sufficient to emit at least one UWB message. The control module 22 can also comprise a processor which is deactivated during the charging of the electric accumulator 24. When the electrical energy becomes sufficient to emit a UWB message, then the discrete electronic components can activate the processor of the control module 22 as well as, where applicable, the simplex communication module 21 in order to execute the subsequent steps of the method 60 for emitting.

When the criterion of sufficient electrical energy for the emitting of at least one UWB message is satisfied (reference 621 in FIG. 3), the method 60 for emitting comprises a step 63 of selecting, for example by the control module 22, of a random emission delay. The random emission delay is for example selected randomly in a predetermined range of possible delays, delimited by a minimum delay value that can be positive or zero and a maximum delay value that can be greater than the duration of one or several UWB messages.

Generally, any known method of selecting random values can be implemented, and the choice of a particular method forms only an alternative implementation of the disclosure. The method for selecting random values retained must make it possible to ensure that, at the same given instant, the probability that two different emitting devices 20 simultaneously select the same random emission delay is low.

Once the random emission delay is selected, the control module 22 and the simplex communication module 21 wait before emitting a UWB message, for the entire duration of said random emission delay selected. It is only at the expiration of said random emission delay selected that the method 60 for emitting comprises a step 64 of emitting, by the simplex communication module 21, a UWB message.

Such as indicated hereinabove, the time required to store in the electric accumulator 24 an electrical energy sufficient for the emitting of a UWB message will generally vary from one emitting device 20 to another. As such, even if two emitting devices 20 emit simultaneously UWB messages, then the subsequent emitting of new UWB messages by these emitting devices 20 will be done at different instants if the charging conditions of these emitting devices 20 are different. Furthermore, selecting a random emission delay makes it possible to further improve the random nature of the emitting instants of UWB messages. If the electrical energy remaining at the end of the emitting of this UWB message is insufficient for emitting another UWB message, then the control module 22 can for example deactivate the simplex communication module 21 and/or the processor of said control module 22, while the electric accumulator 24 continues to be charged (step 61) by the module 23 for receiving wireless electrical energy, and until the criterion of sufficient electrical energy for the emitting of a UWB message is again satisfied.

Note that the selecting and the using of a random emission delay can concern only the emitting of certain UWB messages emitted by the emitting device 20. As such, it is possible to emit certain UWB messages without selecting and without using a random emission delay. Alternatively, it is also possible to select and use a random emission delay before the emitting of each UWB message.

In preferred aspects of the disclosure, when the electrical energy is sufficient to successively emit several UWB messages without having to recharge the electric accumulator 24 between the emitting of two consecutive UWB messages, then a random emission delay is selected and used to delay the emitting of a single of said UWB messages or of a portion only of said UWB messages. In other terms, at least one of said UWB messages is emitted without random emission delay.

In the rest of the description, we consider in a non-limiting manner the case where the electrical energy is sufficient to successively emit a first UWB message and a second UWB message. The term "energy sufficient to successively emit a first UWB message and a second UWB message" means that the electrical energy remaining in the electric accumulator 24 after the emitting of the first UWB message is sufficient to continue with the emitting of the second UWB message. Indeed, during the emitting of the first UWB message, the electric accumulator 24 is discharged but this discharge can be limited by the fact that, in parallel, said electric accumulator 24 is charged by the module 23 for receiving wireless electrical energy. What is important therefore is to know if, after having emitted a first UWB message, enough electrical energy remains to immediately emit (i.e. without having to recharge said electric accumulator 24) a second UWB message.

Figure 4:
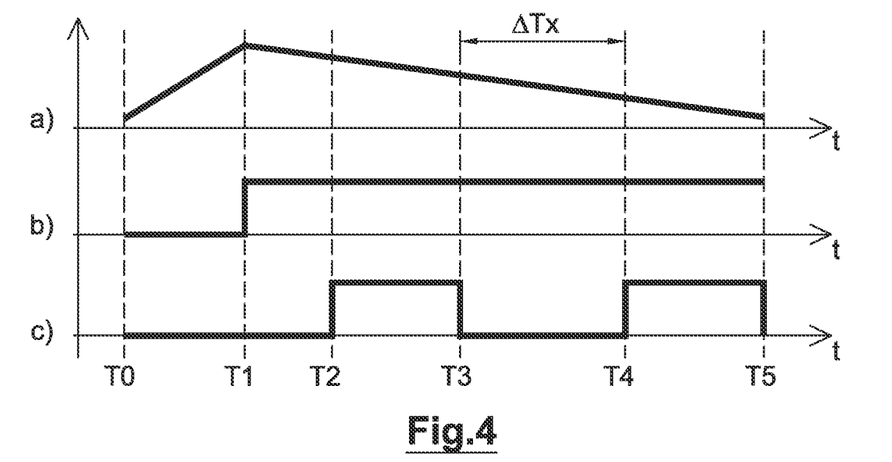
FIG. 4: a temporal diagram showing a first aspect in the case where two UWB messages are emitted successively by the emitting device.
Figure 5:
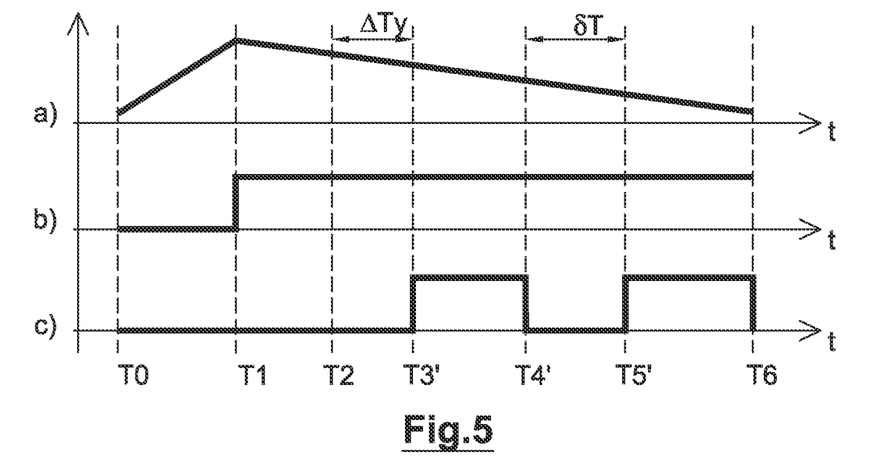
FIG. 5: a temporal diagram showing a second aspect in the case where two UWB messages are emitted successively by the emitting device.

FIGS. 4 and 5 schematically show temporal diagrams that show two different aspects in the case where a first UWB message and a second UWB message are emitted successively by the emitting device 20. More particularly, FIG. 4 shows the case where a random emission delay is selected and used only for the emitting of the second UWB message, while FIG. 5 shows the case where a random emission delay is selected and used only for the emitting of the first UWB message.

In FIGS. 4 and 5, we consider in a non-limiting way the case where the control module 22 comprises a processor which is deactivated by default, and which is activated only when the electrical energy stored in the electric accumulator 24 makes it possible to emit one or several UWB messages.

The portion a) of FIG. 4 shows the evolution, over time, of the level of charge of the electric accumulator 24. The portion b) of FIG. 4 shows the state of the processor of the control module 22: a low level means that the processor is deactivated, while a high level means that the processor is activated. The portion c) of FIG. 4 shows the emitting activity of the simplex communication module 21: a low level means that no UWB message is in the process of being emitted, while a high level means that a UWB message is in the process of being emitted.

As shown in FIG. 4, the electric accumulator 24 is charged from an instant T0. At the instant T0, the processor is deactivated and no UWB message is emitted. The electric accumulator 24 is charged progressively until an instant T1, from which the electrical energy stored is sufficient to emit a UWB message, in such a way that the sufficient energy criterion is satisfied. At the instant T1, the processor is activated. Due to the fact that the processor was deactivated beforehand, it is not possible to immediately emit the first UWB message because the activation of said processor is not instantaneous. At an instant T2, the activation of said processor is terminated and, more preferably, the first UWB message is emitted as soon as possible after said activation is terminated, for example directly at the instant T2. The emitting of the first UWB message ends at an instant T3. At the instant T3, it is determined that the electrical energy stored in the electric accumulator 24, which has decreased progressively since the instant T1, is sufficient to emit a second UWB message. A random emission delay is selected and the value selected is designated by ΔTx. The emitting device 20 therefore waits for the entire duration of the random emission delay ΔTx, the processor remaining activated. The emitting of the second UWB message begins at the expiration of the random emission delay, i.e. at an instant T4 equal to (T3+ΔTx). The emitting of the second UWB message ends at an instant T5. At the instant T5, the emitting device 20 can for example stop emitting UWB messages, in particular if the electrical energy stored in the electric accumulator 24 no long makes it possible to emit another UWB message. In such a case, the processor and the simplex communication module 21 are more preferably deactivated starting from the instant T5. If the electrical energy is sufficient, then it is possible to continue emitting UWB messages, with or without random emission delay.

FIG. 5 is identical to FIG. 4 until the instant T2 at which the activation of the processor is terminated. At the instant T2, a random emission delay is selected and the value selected is designated by ΔTy. The emitting device 20 therefore waits for the entire duration of the random emission delay ΔTy, the processor remaining activated. The emitting of the first UWB message begins at the expiration of the random emission delay, i.e. at an instant T3' equal to (T2+ΔTy). The emitting of the first UWB message ends at an instant T4'. At the instant T4', it is determined that the electrical energy stored in the electric accumulator 24, which has decreased progressively since the instant T1, is sufficient to emit a second UWB message. It is possible to introduce, between the emitting of the first UWB message and the emitting of the second UWB message, a predetermined deterministic emitting delay δT (i.e. not random), in order to retain a minimum difference between the UWB messages emitted by the emitting device 20. It is however also possible to emit the second UWB message directly at the instant T4'. In the example shown in FIG. 5, the emitting of the second UWB message starts at the expiration of a deterministic emitting delay, i.e. at an instant T5' equal to (T4'+δT). The emitting of the second UWB message ends at an instant T6. At the instant T6, the emitting device 20 can for example stop emitting UWB messages, in particular if the electrical energy stored in the electric accumulator 24 no longer makes it possible to emit another UWB message. In such a case, the processor and the simplex communication module 21 are more preferably deactivated starting from the instant T6. If the electrical energy is sufficient, then it is possible to continue emitting UWB messages, with or without random emission delay.

Figure 6:
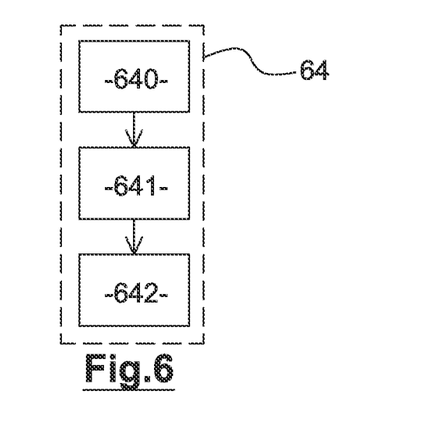
FIG. 6: a functional diagram showing a preferred aspect of a step of emitting UWB messages.

FIG. 6 schematically shows a preferred aspect of the step 64 of emitting a UWB message.

As shown in FIG. 6, the step 64 of emitting comprises a step 640 of obtaining a sequence of information bits, which correspond for example to a unique identifier of said emitting device 20.

Then the step 64 of emitting comprises a step 641 of modulating the sequence of information bits in such a way as to obtain a sequence of information symbols. The possible information symbols corresponding to different spreading codes associated respectively with groups of information bits with different values. The spreading codes advantageously have good autocorrelation and inter-correlation properties, and correspond for example to M-sequences, Gold sequences, etc. For example, it is possible to consider groups of N information bits, which can therefore have $2^N$ different values which are associated respectively with $2^N$ different spreading codes. As such, the value "0 0 0 0" is associated with a first spreading code, the value "0 0 0 1" is associated with a second spreading code, the value "0 0 1 0" is associated with a third spreading code, etc. Each spreading code is formed by a number M of bits to be emitted, M being greater than N and preferably greater than or equal to $2^N$. As such, if the bits to be emitted are sequenced at a predetermined period Tc, the bits of information are sequenced at a period M·Tc/N. For example, the number N is equal to 4 and the number M is equal to 256.

Such arrangements, which revert to spreading each information bit over several bits to be emitted ("chips") at a higher speed, make it possible to facilitate the detection of UWB messages and the extracting of the information bits by the receiving stations 30.

The step 64 of emitting then comprises a step 642 of forming the UWB message from the sequence of information symbols, during which the bits to be emitted are converted into radio pulses.

More generally, note that the aspects and implementations considered hereinabove have been described by way of non-limiting examples, and that other alternatives can consequently be considered.

In particular, the disclosure was described by considering that the communication module 21 of the emitting device 20 is a simplex communication module. Nothing excludes however, according to other examples, having a communication module also suited for receiving UWB messages, of the half-duplex or full duplex type. However, using a simplex communication module 21 is particularly advantageous in the case of an emitting device 20 that is remotely and wirelessly powered with electrical energy, as the electrical consumption associated with a simplex communication module is more reduced.

Furthermore, the disclosure has been described by considering that the emitting device 20 comprises a module 23 for receiving wireless electrical energy. Nothing excludes however, according to other examples, having alternatively or as a complement other means that allow said emitting device 20 to be autonomous electrically. For example, the emitting device 20 can comprise one or several photovoltaic panels, one or several thermoelectric converters, etc.

What is claimed is:

1. A method for emitting, by an emitting device to at least one receiving station, messages in the form of sequences of ultra-wide band radio pulses, referred to as "UWB messages", said emitting device comprising a simplex communication module for the emitting of UWB messages, wherein said emitting device comprises a module for receiving wireless electrical energy suitable for receiving electrical energy emitted by at least one wireless electrical power supply station and for storing the electrical energy received in an electric accumulator, and wherein said method comprises:

charging the electric accumulator by the module for receiving wireless electrical energy, and evaluating a power criterion of sufficient electrical energy for successively emitting a first UWB message and a second UWB message after the first UWB message, when the power criterion of sufficient electrical energy is satisfied: selecting a random emission delay and emitting the first UWB message and the second UWB message after the first UWB message, by the simplex communication module, only the second UWB message, among the first UWB message and the second UWB message, being emitted after the expiration of said selected random emission delay.

2. The method according to claim 1, wherein the emitting of a UWB message comprises:

obtaining a sequence of information bits, modulating the sequence of information bits in such a way as to obtain a sequence of information symbols, the possible information symbols corresponding to different spreading codes associated respectively with groups of information bits with different values, and forming the UWB message from the sequence of information symbols.

3. The method according to claim 1, wherein each ultra-wide band radio pulse is formed by multiplying a sinusoidal signal by a pulse envelope.

4. A method for estimating the position of an emitting device, comprising:

emitting, by the emitting device, UWB messages in accordance with a method according to claim 1, receiving UWB messages emitted by the emitting device by at least one receiving station having a predetermined position, and estimating the position of the emitting device according to the UWB messages received by said at least one receiving station.

5. A computer program product comprising a set of non-transitory program code instructions which, when they are executed by an emitting device, configure said emitting device to implement a method for emitting according to claim 1.

6. An emitting device suitable for emitting to at least one receiving station messages in the form of sequences of ultra-wide band radio pulses, referred to as "UWB messages", said emitting device comprising a simplex communication module for the emitting of UWB messages, wherein said emitting device further comprises a module for receiving wireless electrical energy suitable for receiving electrical energy emitted by at least one wireless electrical power supply station and for storing the electrical energy received in an electric accumulator of said emitting device, and a control module configured to:

evaluate a power criterion of sufficient electrical energy, in the electric accumulator charged by the module for receiving wireless electrical energy, for successively emitting a first UWB message and a second UWB message after the first UWB message, and when the power criterion of sufficient electrical energy is satisfied: select a random emission delay and emitting the first UWB message and the second UWB message, by the intermediary of the simplex communication module, only the second UWB message, among the first UWB message and the second UWB message, being emitted after the expiration of said random emission delay selected.

7. The emitting device according to claim 6, wherein, for the emitting of a UWB message, the control module is configured to:

obtain a sequence of information bits, modulate the sequence of information bits in such a way as to obtain a sequence of information symbols, the possible information symbols corresponding to different spreading codes associated respectively with groups of information bits with different values, and form the UWB message from the sequence of information symbols.

8. The emitting device according to claim 6, wherein each ultra-wide band radio pulse is formed by multiplying a sinusoidal signal by a pulse envelope.

9. A system for estimating the position of an emitting device comprising:

an emitting device according to claim 6, at least one wireless electrical power supply station, at least one receiving station, having a predetermined position, suitable for receiving UWB messages emitted by the emitting device, and at least one server configured to estimate the position of the emitting device according to the UWB messages received by said at least one receiving station.

* * * * *